(12) United States Patent
Wang (10) Patent No.: US 11,445,522 B2
(45) Date of Patent: Sep. 13, 2022

(54) VEHICLE COMMUNICATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 120 days.

(21) Appl. No.: 17/075,612

(22) Filed: Oct. 20, 2020

(65) Prior Publication Data

US 2021/0037542 A1 Feb. 4, 2021

Related U.S. Application Data

(63) Continuation of application No. PCT/CN2019/091809, filed on Jun. 19, 2019.

(30) Foreign Application Priority Data

Oct. 8, 2018 (CN) .......................... 201811169725.8

(51) Int. Cl.
*H04W 72/10* (2009.01)
*H04W 4/46* (2018.01)
(Continued)

(52) U.S. Cl.
CPC ............ *H04W 72/10* (2013.01); *H04W 4/46* (2018.02); *H04W 72/044* (2013.01); *H04W 72/0486* (2013.01); *H04W 84/18* (2013.01)

(58) Field of Classification Search
CPC ............... H04W 72/10; H04W 72/044; H04W 72/0486; H04W 4/46; H04W 84/18
See application file for complete search history.

(56) References Cited

U.S. PATENT DOCUMENTS

2019/0207778 A1\* 7/2019 Qiao ...................... H04W 4/24
2019/0313359 A1\* 10/2019 Lee ....................... H04W 60/04
(Continued)

FOREIGN PATENT DOCUMENTS

CN   106572516 A   4/2017
CN   108307516 A   7/2018
(Continued)

OTHER PUBLICATIONS

Tencent Technology, WO, PCT/CN2019/091809, Sep. 10, 2019, 4 pgs.
(Continued)

*Primary Examiner* — Robert C Scheibel
(74) *Attorney, Agent, or Firm* — Morgan, Lewis & Bockius LLP (57) ABSTRACT

Embodiments of this application provide a vehicle communication method, a non-transitory computer-readable storage medium, and an electronic device. The method may be applied to a network side device. After receiving a connection establishment request transmitted by user equipment, identification information of a plurality of network slices being carried in the connection establishment request, the network side device determines whether the plurality of network slices correspond to a same vehicle communication service according to the identification information of the plurality of network slices. When the plurality of network slices are determined to correspond to the same vehicle communication service, the network side device establishes a protocol data unit (PDU) session with the user equipment. The technical solutions of the embodiments of this application increase the number of vehicle communication use cases that the user equipment can support, and facilitate a promotion and a deployment of an Internet of Vehicles solution.

18 Claims, 4 Drawing Sheets

(51) Int. Cl.
*H04W 72/04* (2009.01)
*H04W 84/18* (2009.01)

(56) References Cited

U.S. PATENT DOCUMENTS

| | | | | |
|---|---|---|---|---|
| 2020/0245127 | A1* | 7/2020 | Zong | H04W 36/0077 |
| 2020/0359208 | A1* | 11/2020 | Wu | H04W 12/041 |

FOREIGN PATENT DOCUMENTS

| | | | |
|---|---|---|---|
| CN | 108323245 A | | 7/2018 |
| CN | 108476547 A | | 8/2018 |
| CN | 109040322 A | | 12/2018 |
| WO | WO 2017143047 | A1 | 8/2017 |
| WO | WO 2018086060 | A1 | 5/2018 |
| WO | WO 2018137873 | A1 | 8/2018 |
| WO | WO 2018141269 | A1 | 8/2018 |
| WO | WO 2018149269 | A1 | 8/2018 |

OTHER PUBLICATIONS

Tencent Technology, IPRP, PCT/CN2019/091809, Apr. 8, 2021, 5 pgs.

"3rd Generation Partnership Project; Technical Specification Group Services and System Aspects; Procedures for the 5G System; Stage 2 (Release 15)", 3GPP Draft; 23502-F30 CRS Implemented Approved-CRS, 3rd Generation Partnership Project (3GPP), Mobile Competence Centre, 650, Route Des Lucioles ; F-06921 Sophia-Antipolis Cedex ; France, Sep. 17, 2018, XP051535185, Retrieved from the Internet: http://www.3gpp.org/ftp/tsg%5Fsa/WG2%5FArch/Latest%5FSA2%5FSpecs/DRAFT%5FINTERIM/23502%2Df30%5FCRs%5FImplemented%5Fapproved%2DCRs%2Ezip.

Extended European Search Report, EP19871415.6, dated Jun. 11, 2021, 9 pgs.

NTT DOCOMO, "Correction of Having Multiple S-NSSAIs for a Single PDU Session", 3GPP Draft; 23502 CR0496R1 5GS PH1 (Rel-15), S2-186020 was S2-185416 CR0496 23502 SNSSAI-CorrectionPerPDUSession, 3rd Generation Partnership Project (3GPP), Mobile Competence Centre; 650, Route Des Lu, vol. SA WG2, Newport Beach, USA; May 28, 2018-Jun. 1, 2018, Jun. 6, 2018, XP051532830, Retrieved from the Internet: http://www.3gpp.org/ftp/tsg%5Fsa/TSG%5FSA/TSGS%5F80/Docs/SP%2D180482%2Ezip.

3GPP, "Technical Specification Group Services and System Aspects; Study on Enhancement of Network Slicing (Release 16)," 3GPP TR 23.740, V0.5.0, Aug. 2018, 53 pgs.

Tencent Technology, ISR, PCT/CN2019/091809, Sep. 10, 2019, 2 pgs.

\* cited by examiner

VEHICLE COMMUNICATION METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2019/091809, entitled "VEHICLE COMMUNICATION METHOD, DEVICE, COMPUTER READABLE MEDIUM AND ELECTRONIC DEVICE" filed on Jun. 19, 2019, which claims priority to Chinese Patent Application No. 201811169725.8, filed with the State Intellectual Property Office of the People's Republic of China on Oct. 8, 2018, and entitled "VEHICLE COMMUNICATION METHOD AND APPARATUS, COMPUTER-READABLE MEDIUM, AND ELECTRONIC DEVICE", all of which are incorporated herein by reference in their entirety.

FIELD OF THE TECHNOLOGY

This application relates to the field of computer and communication technologies, and specifically, to a vehicle communication method and apparatus, a computer-readable medium, and an electronic device.

BACKGROUND OF THE DISCLOSURE

5G Internet of Vehicles includes more than 20 types of different vehicle-to-everything (V2X) use cases. Different use cases have different quality of service (QoS) requirements. Different V2X use cases may use different network slices due to different QoS requirements, and the number of V2X use cases is far greater than 8. However, the 3rd Generation Partnership Project Release 15 (3GPP Rel-15) stipulates that one piece of user equipment (UE) supports up to eight network slices, and different network slices have to use different protocol data unit (PDU) sessions. Such an assumption has a large limitation, which is not conducive to a deployment of network slices in Internet of Vehicles communication.

SUMMARY

Embodiments of this application provide a vehicle communication method and apparatus, a non-transitory computer-readable storage medium and an electronic device, to increase, at least to a certain extent, the number of vehicle communication use cases that a user equipment can support, and facilitate a promotion and a deployment of an Internet of Vehicles solution.

Other features and advantages of this application become obvious through the following detailed descriptions or partially learned through the practice of this application.

According to an aspect of the embodiments of this application, a vehicle communication method applied to a network side device is provided, the method including: receiving a connection establishment request transmitted by user equipment, identification information of a plurality of network slices being carried in the connection establishment request; determining whether the plurality of network slices correspond to the same vehicle communication service according to the identification information of the plurality of network slices; and establishing, in a case that the plurality of network slices are determined to correspond to the same vehicle communication service, a PDU session with the user equipment.

According to an aspect of the embodiments of this application, a vehicle communication method applied to a network side device is provided, the method including: receiving a connection establishment request transmitted by user equipment, identification information of a virtual bundling network slice being carried in the connection establishment request; and determining identification information of a plurality of network slices corresponding to the virtual bundling network slice according to the identification information of the virtual bundling network slice, to establish a PDU session with the user equipment based on the plurality of network slices.

According to an aspect of the embodiments of this application, a vehicle communication apparatus is provided, including: a receiving unit, configured to receive a connection establishment request transmitted by user equipment, identification information of a plurality of network slices being carried in the connection establishment request; a determining unit, configured to determine whether the plurality of network slices correspond to the same vehicle communication service according to the identification information of the plurality of network slices; and a processing unit, configured to establish, in a case that the plurality of network slices are determined to correspond to the same vehicle communication service, a PDU session with the user equipment.

In some embodiments of this application, based on the foregoing solutions, a value interval of the identification information of the plurality of network slices is in a predetermined interval, to indicate that the plurality of network slices correspond to the same PDU session; or a slice/service type (SST) field in the identification information of the plurality of network slices includes an indicator bit, to indicate that the plurality of network slices correspond to the same PDU session; or a slice differentiator (SD) field in the identification information of the plurality of network slices includes an indicator bit, to indicate that the plurality of network slices correspond to the same PDU session.

In some embodiments of this application, based on the foregoing solutions, the processing unit is further configured to control, in the PDU session, different network slices or different vehicle communication use cases to correspond to different QoS flows.

In some embodiments of this application, based on the foregoing solutions, the processing unit is further configured to isolate the different QoS flows by using a GPRS tunneling protocol user plane (GTP-U), a virtual private network (VPN) or a bandwidth management mechanism.

In some embodiments of this application, based on the foregoing solutions, the vehicle communication apparatus further includes: a scheduling unit, configured to schedule the user equipment to use different wireless transmission resources for different network slices.

In some embodiments of this application, based on the foregoing solutions, the vehicle communication apparatus further includes: a configuration unit, configured to configure wireless transmission resource pools for different network slices, to make the user equipment use different wireless transmission resources for different network slices. A priority of the wireless transmission resource pool has a positive correlation with a priority of the network slice corresponding to the wireless transmission resource pool, and the resource size of the wireless transmission resource pool has a positive correlation with the priority of the network slice corresponding to the wireless transmission resource pool.

In some embodiments of this application, based on the foregoing solutions, the configuration unit is configured to transmit a configuration signaling to the user equipment, to configure the wireless transmission resource pools corresponding to the different network slices for the user equipment, or to pre-configure the wireless transmission resource pools corresponding to the different network slices for the user equipment.

In some embodiments of this application, based on the foregoing solutions, the configuration unit is configured to use the configuration signaling transmitted to the user equipment to indicate the wireless transmission resource pools corresponding to the different network slices in an explicit or implicit manner.

In some embodiments of this application, based on the foregoing solutions, the vehicle communication apparatus further includes: a transmission unit, configured to transmit available network slice information to the user equipment, the available network slice information including the identification information of the plurality of network slices.

In some embodiments of this application, based on the foregoing solutions, the plurality of network slices correspond to the same access and mobility function (AMF) and the same user plane function (UPF).

In some embodiments of this application, based on the foregoing solutions, the vehicle communication apparatus further includes: an expansion unit, configured to expand the number of data radio bearers, to expand the number of network slices supported by the user equipment.

According to an aspect of the embodiments of this application, a vehicle communication apparatus is provided, including: a receiving unit, configured to receive a connection establishment request transmitted by user equipment, identification information of a virtual bundling network slice being carried in the connection establishment request; and a processing unit, configured to determine identification information of a plurality of network slices corresponding to the virtual bundling network slice according to the identification information of the virtual bundling network slice, to establish a PDU session with the user equipment based on the plurality of network slices.

In some embodiments of this application, based on the foregoing solutions, the processing unit is configured to determine the identification information of the plurality of network slices corresponding to the virtual bundling network slice according to a pre-configured correspondence.

In some embodiments of this application, based on the foregoing solutions, the vehicle communication apparatus further includes: a transmission unit, configured to transmit available network slice information to the user equipment, the available network slice information including the identification information of the virtual bundling network slice.

In some embodiments of this application, based on the foregoing solutions, a value interval of the identification information of the virtual bundling network slice is in a predetermined interval, to indicate that the virtual bundling network slice corresponds to the plurality of network slices; or an SST field in the identification information of the virtual bundling network slice includes an indicator bit, to indicate that the virtual bundling network slice corresponds to the plurality of network slices; or an SD field in the identification information of the virtual bundling network slice includes an indicator bit, to indicate that the virtual bundling network slice corresponds to the plurality of network slices.

According to an aspect of the embodiments of this application, a computer-readable medium is provided, storing a computer program, the computer program, when executed by a processor, implementing the vehicle communication method according to the foregoing embodiments.

According to an aspect of the embodiments of this application, an electronic device is provided, including: one or more processors; and a storage apparatus, configured to store one or more programs, the one or more programs, when executed by the one or more processors, causing the one or more processors to implement the vehicle communication method according to the foregoing embodiments.

In technical solutions provided by some embodiments of this application, a network side device receives a connection establishment request transmitted by user equipment, and establishes a PDU session with the user equipment in a case that identification information of a plurality of network slices included in the connection establishment request is determined to correspond to the same vehicle communication service, thereby enabling the plurality of network slices to share one PDU session, and further enabling the user equipment to support more network slices by establishing a plurality of PDU sessions. The number of network slices corresponds to the number of vehicle communication use cases, thereby increasing the number of vehicle communication use cases that the user equipment can support, and facilitating a promotion and a deployment of an Internet of Vehicles solution.

In technical solutions provided by some embodiments of this application, a network side device receives a connection establishment request transmitted by user equipment, and determines identification information of a plurality of network slices corresponding to a virtual bundling network slice according to identification information of the virtual bundling network slice carried in the connection establishment request, thereby enabling the user equipment to support more network slices by using the virtual bundling network slice corresponding to the plurality of network slices. The number of network slices corresponds to the number of vehicle communication use cases, thereby increasing the number of vehicle communication use cases that the user equipment can support, and facilitating a promotion and a deployment of an Internet of Vehicles solution.

It is to be understood that, the foregoing general descriptions and the following detailed descriptions are merely for illustration and explanation purposes, and cannot limit this application.

BRIEF DESCRIPTION OF THE DRAWINGS

Accompanying drawings herein are incorporated into a specification and constitute a part of this specification, show embodiments that conform to this application, and are used to describe a principle of this application together with this specification. Apparently, the accompanying drawings described below are merely some embodiments of this application, and a person of ordinary skill in the art may further obtain other accompanying drawings according to the accompanying drawings without creative efforts. In the drawings.

DESCRIPTION OF EMBODIMENTS

At present, the examples of implementations are described more comprehensively with reference to the accompanying drawings. However, the examples of implementations can be implemented in various forms, and it is not to be understood as being limited to the examples described herein. On the contrary, the implementations are provided to make this application more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a full understanding of the embodiments of this application. However, a person of ordinary skill in the art is to be aware that, the technical solutions in this application may be implemented without one or more of the particular details, or other methods, unit, apparatus, or step may be adopted. In other cases, well-known methods, apparatuses, implementations, or operations are not shown or described in detail, to avoid obscuring aspects of this application.

The block diagrams shown in the accompany drawings are merely functional entities and do not necessarily correspond to physically independent entities. That is, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, and some operations/steps may be combined or partially combined. Therefore, an actual execution order may be changed according to the actual situation.

Figure 1:
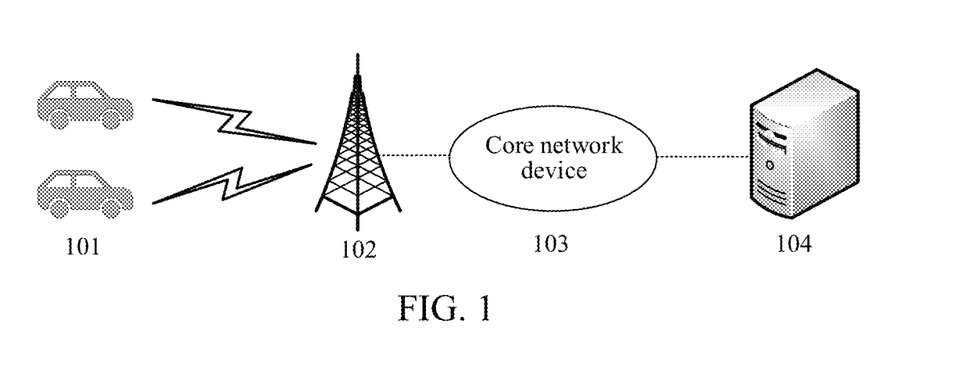
FIG. 1 is a schematic diagram of an exemplary system architecture to which a technical solution according to an embodiment of this application may be applied.

FIG. 1 is a schematic diagram of an exemplary system architecture to which a technical solution according to an embodiment of this application may be applied.

As shown is FIG. 1, the system architecture may include a vehicle terminal 101, a next generation Node B (gNB) 102, a core network device 103 and an application server 104. The core network device 103 may be an AMF in a 5G core network or the like.

It is to be understood that the number of vehicle terminals 101, the number of gNBs 102, the number of core network devices 103 and the number of application servers 104 shown in FIG. 1 are merely schematic. According to an implementation requirement, there may be any number of vehicle terminals 101, any number of gNBs 102, any number of core network devices 103 and any number of application servers 104.

In an embodiment of this application, after a network side device (the gNB 102, the core network device 103 or the application server 104 shown in FIG. 1) receives a connection establishment request transmitted by the vehicle terminal 101, if the connection establishment request carries identification information of a plurality of network slices and the plurality of network slices are determined to correspond to the same vehicle communication service, the network side device may establish a PDU session with the vehicle terminal 101, thereby enabling the vehicle terminal 101 to support more network slices by establishing a plurality of PDU sessions. The number of network slices corresponds to the number of V2X use cases, thereby increasing the number of V2X use cases that user equipment can support, and facilitating a promotion and a deployment of an Internet of Vehicles solution. In this application, the term "PDU" refers to a single unit of information transmitted among peer entities of a computer network. A PDU is composed of protocol-specific control information and user data. The term "user equipment" or "vehicle terminal" may be a standalone device located in a vehicle or integrated therein.

In another embodiment of this application, after a network side device (the gNB 102, the core network device 103 or the application server 104 shown in FIG. 1) receives a connection establishment request transmitted by the vehicle terminal 101, if the connection establishment request carries identification information of a virtual bundling network slice, the network side device may determine identification information of a plurality of network slices corresponding to the virtual bundling network slice according to the identification information of the virtual bundling network slice, to establish a PDU session with the vehicle terminal 101 based on the plurality of network slices, thereby enabling the vehicle terminal 101 to support more network slices by using the virtual bundling network slice corresponding to the plurality of network slices. The number of network slices corresponds to the number of V2X use cases, thereby increasing the number of V2X use cases that user equipment can support, and facilitating a promotion and a deployment of an Internet of Vehicles solution.

Figure 2:
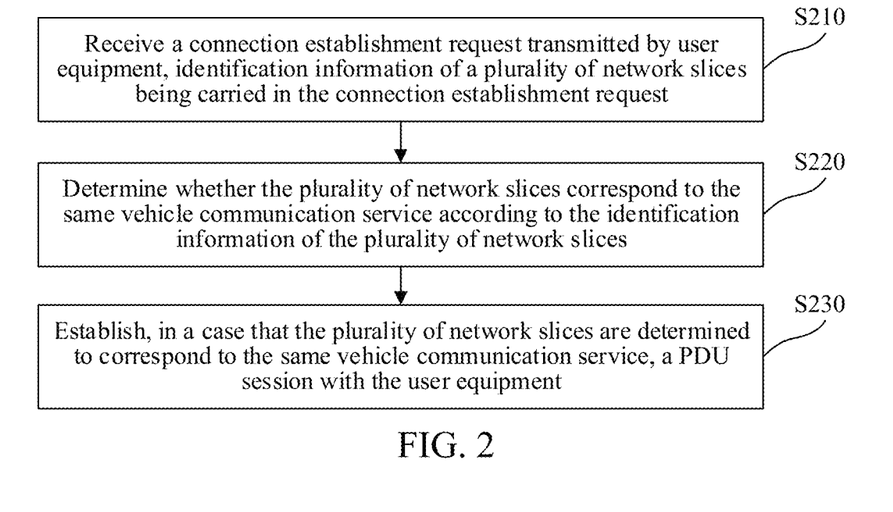
FIG. 2 is a schematic flowchart of a vehicle communication method according to an embodiment of this application.

The implementation details of the technical solutions of the embodiments of this application are described in detail as follows:

FIG. 2 is a schematic flowchart of a vehicle communication method according to an embodiment of this application. The vehicle communication method may be performed by a network side device. For example, the vehicle communication method may be performed by a gNB, a core network device, or an application server of a network edge. Referring to FIG. 2, the vehicle communication method includes at least S210 to S230. A detailed description is as follows:

S210: Receive a connection establishment request transmitted by user equipment, identification information of a plurality of network slices being carried in the connection establishment request.

In an embodiment of this application, the user equipment may be a vehicle terminal, and the connection establishment request transmitted by the user equipment may be a request for establishing a PDU session. Identification information of a network slice may be single network slice selection assistance information (S-NSSAI).

In an embodiment of this application, before receiving the connection establishment request transmitted by the user equipment, the network side device may transmit available network slice information (such as Allowed NSSAI) to the user equipment. The available network slice information includes the identification information of the plurality of network slices, so as to help the user equipment to select from the available network slice information.

In an embodiment of this application, to be distinguished from the current solution in which identification information of only one network slice is carried in a message transmitted by the user equipment (such as Rel-15 MSG5 RRC Setup Complete), the identification information of the plurality of network slices carried in the connection establishment request in the embodiments of this application may include the following configurations:

Configuration 1:

In an embodiment of this application, a value interval of the identification information of the plurality of network slices is in a predetermined interval, to indicate that the plurality of network slices correspond to the same PDU session. The predetermined interval needs to be different from a value interval of identification information of a common network slice (a common network slice is a network slice carried in a message transmitted by user equipment in the current solution).

Configuration 2:

In an embodiment of this application, an SST field in the identification information of the plurality of network slices includes an indicator bit, to indicate that the plurality of network slices correspond to the same PDU session.

Configuration 3:

In an embodiment of this application, an SD field in the identification information of the plurality of network slices includes an indicator bit, to indicate that the plurality of network slices correspond to the same PDU session.

In an embodiment of this application, the plurality of network slices may correspond to the same AMF and the same UPF.

Still referring to FIG. 2, S220: determine whether the plurality of network slices correspond to the same vehicle communication service according to the identification information of the plurality of network slices.

In an embodiment of this application, in a case that the network side device receives the connection establishment request including identification information of the plurality of network slices, whether the plurality of network slices correspond to the same vehicle communication service may be determined according to an indication of a service request message included in the connection establishment request.

Still referring to FIG. 2, S230: establish, in a case that the plurality of network slices are determined to correspond to the same vehicle communication service, a PDU session with the user equipment.

The technical solution of the embodiment shown in FIG. 2 enables the plurality of network slices to share one PDU session, thereby enabling the user equipment to support more network slices by establishing a plurality of PDU sessions. The number of network slices corresponds to the number of V2X use cases, thereby increasing the number of V2X use cases that the user equipment can support, and facilitating a promotion and a deployment of an Internet of Vehicles solution.

Based on the technical solution of the embodiment shown in FIG. 2, in an embodiment of this application, after the network side device establishes a PDU session with the user equipment, different network slices or different V2X use cases correspond to different QoS flows in the PDU session.

In an embodiment of this application, if different network slices or different V2X use cases correspond to different QoS flows, the different QoS flows may be isolated by using a GTP-U protocol, a VPN, or a bandwidth management mechanism.

In an embodiment of this application, to isolate different network slices from each other, it may be ensured, in a manner of scheduling of the network side device, that the user equipment use different wireless transmission resources for different network slices. The wireless transmission resources include a time domain resource and a frequency domain resource.

In another embodiment of this application, to isolate different network slices from each other, alternatively, wireless transmission resource pools may be configured for different network slices, to make the user equipment use different wireless transmission resources for different network slices. A priority of the wireless transmission resource pool has a positive correlation with a priority of the network slice corresponding to the wireless transmission resource pool, and the resource size of the wireless transmission resource pool has a positive correlation with the priority of the network slice corresponding to the wireless transmission resource pool. For example, if the priority and/or resource size of the wireless transmission resource pool becomes larger, the priority of the network slice corresponding to the wireless transmission resource pool becomes larger as well.

In an embodiment of this application, in a case that the wireless transmission resource pools are configured for different network slices, a configuration signaling may be transmitted to the user equipment, to configure the wireless transmission resource pools corresponding to the different network slices for the user equipment, or pre-configure the wireless transmission resource pools corresponding to the different network slices for the user equipment.

In an embodiment of this application, in a case that the wireless transmission resource pools corresponding to the different network slices are configured for the user equipment by using the configuration signaling, the configuration signaling may indicate the wireless transmission resource pools corresponding to the different network slices in an explicit or implicit manner. Optionally, the explicit manner is to directly indicate the wireless transmission resource pools corresponding to the different network slices. The implicit manner may be to indicate a plurality of wireless transmission resource pools in order. The plurality of wireless transmission resource pools respectively correspond to different network slices.

In an embodiment of this application, the foregoing configuration signaling may be a Radio Resource Control (RRC) signaling or a non-access stratum (NAS) signaling.

In an embodiment of this application, the number of network slices supported by the user equipment may be further expanded by expanding the number of data radio bearers (DRBs).

Figure 3:
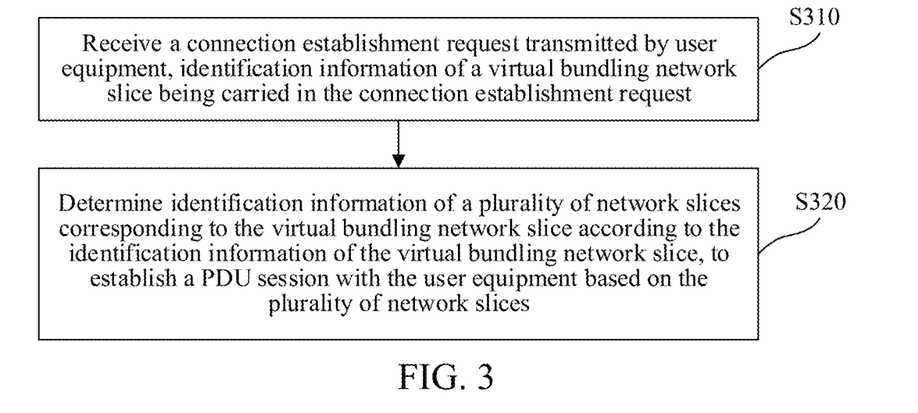
FIG. 3 is a schematic flowchart of a vehicle communication method according to an embodiment of this application.

FIG. 3 is a schematic flowchart of a vehicle communication method according to an embodiment of this application. The vehicle communication method may be performed by a network side device. For example, the vehicle communication method may be performed by a gNB, a core network device, or an application server of a network edge. Referring to FIG. 3, the vehicle communication method includes at least S310 and S320. A detailed description is as follows:

Step S310: Receive a connection establishment request transmitted by user equipment, identification information of a virtual bundling network slice being carried in the connection establishment request.

In an embodiment of this application, the user equipment may be a vehicle terminal, and the connection establishment request transmitted by the user equipment may be a request for establishing a PDU session. Identification information of a network slice may be S-NSSAI.

In an embodiment of this application, the virtual bundling network slice corresponds to a plurality of network slices really existing. Specifically, a plurality of network slices really existing are bundled to obtain a virtual network slice corresponding to the plurality of network slices really existing, and the virtual network slice is referred to as the virtual bundling network slice. Identification information of the virtual bundling network slice may also be S-NSSAI.

In an embodiment of this application, before receiving the connection establishment request transmitted by the user equipment, the network side device may transmit available network slice information (such as Allowed NSSAI) to the user equipment. The available network slice information includes the identification information of the virtual bundling network slice, so as to help the user equipment to select from the available network slice information.

In an embodiment of this application, to be distinguished from the current solution in which identification information of only one network slice is carried in a message transmitted by the user equipment (such as Rel-15 MSG5 RRC Setup Complete), the identification information of the virtual bundling network slice carried in the connection establishment request in the embodiments of this application may include the following configurations:

Configuration 1:

In an embodiment of this application, a value interval of the identification information of the virtual bundling network slice is in a predetermined interval, to indicate that the virtual bundling network slice corresponds to the plurality of network slices. The predetermined interval needs to be different from a value interval of identification information of a common network slice (a common network slice is a network slice carried in a message transmitted by user equipment in the current solution).

Configuration 2:

In an embodiment of this application, an SST field in the identification information of the virtual bundling network slice includes an indicator bit, to indicate that the virtual bundling network slice corresponds to the plurality of network slices.

Configuration 3:

In an embodiment of this application, an SD field in the identification information of the virtual bundling network slice includes an indicator bit, to indicate that the virtual bundling network slice corresponds to the plurality of network slices.

Still referring to FIG. 3, step S320: determine identification information of a plurality of network slices corresponding to the virtual bundling network slice according to the identification information of the virtual bundling network slice, to establish a PDU session with the user equipment based on the plurality of network slices.

In an embodiment of this application, the identification information of the plurality of network slices corresponding to the virtual bundling network slice may be determined according to a pre-configured correspondence.

In an embodiment of this application, when establishing the PDU session between the network side device and the user equipment based on the plurality of network slices corresponding to the virtual bundling network slice, one network slice may correspond to one PDU session, or a plurality of network slices may correspond to one PDU session.

The technical solution provided by the embodiment shown in FIG. 3 enables the user equipment to support more network slices by using the virtual bundling network slice corresponding to the plurality of network slices. The number of network slices corresponds to the number of vehicle communication use cases, thereby increasing the number of vehicle communication use cases that the user equipment can support, and facilitating a promotion and a deployment of an Internet of Vehicles solution.

In an application scenario of 5G Internet of Vehicles, the implementation details of the technical solutions of the embodiments of this application are described in detail as follows:

In the embodiments of this application, in the application scenario of 5G Internet of Vehicles, for a case that V2X use cases include different QoS requirements, and the V2X use cases need to be isolated from each other through slicing to ensure reliable transmission because V2X security is involved, but the number of V2X use cases is greater than an upper limit allowed by the UE, technical solutions of the following embodiments may be used:

Embodiment 1: Expand the Number of Network Slices that the UE can Support in Parallel The limitation of 3GPP Rel-15 on the number of network slices supported by the UE mainly considers the number of DRBs and the restriction that the introduced network slices have to use different PDU sessions on a radio access network (RAN) side to reduce the impact on specifications on the RAN side. In the embodiments of this application, the number of network slices that the UE can support may be expanded by expanding the number of DRBs. For example, the number of DRBs may be expanded to 32, and therefore the number of slices supported by the UE may also be expanded to 32.

Embodiment 2: Introduce a Mechanism that a Plurality of Network Slices Share One PDU Session In an embodiment of this application, network slices that support sharing of a PDU session may be introduced, that is, establishment of a plurality of network slices is carried by using the same PDU session. One of preconditions of using this solution is that AMFs corresponding to different V2X use cases/network slices are the same, and UPFs corresponding to different V2X use cases/network slices are the same as well.

In an embodiment of this application, all of the plurality of network slices sharing the PDU session need to be embodied in allowed NSSAI.

In an embodiment of this application, the plurality of network slices sharing the PDU session need to be identified and distinguished from other network slices (that is, network slices that share no PDU session) at a protocol level.

In an embodiment of this application, if the network slices sharing the PDU session still use 24-bits S-NSSAI, different ways may be used to distinguish. Optionally, a value interval of the S-NSSAI of the network slices sharing the PDU session may be separated from that of S-NSSAI of a common network slice; or an indicator bit area may be introduced, such as defining a new SST, to add a corresponding identification bit to the new SST; or a corresponding identification bit may be added to an SD part to distinguish.

In an embodiment of this application, a connection establishment process of the plurality of network slices sharing the PDU session may be different from that of the common network slice. Specifically, different from a solution provided by the 3GPP Rel-15 that an MSG5 RRC Setup Complete message carries only one piece of S-NSSAI to be selected by an AMF, in the technical solutions of the embodiments of this application, when the UE initiates the connection establishment request to the network side device, an MSG5 message may carry a plurality of pieces of S-NSSAI. When the network side device (such as the gNB or the AMF) receives the MSG5 message including the plurality of pieces of S-NSSAI, a new function needs to be introduced to identify whether the plurality of pieces of S-NSSAI belong to the same V2X service (for example, an indication of a service request message included in the MSG5 message may be used for determining whether the plurality of pieces of S-NSSAI belong to the same V2X service), and then establishment of only one PDU session is triggered.

Figure 4:
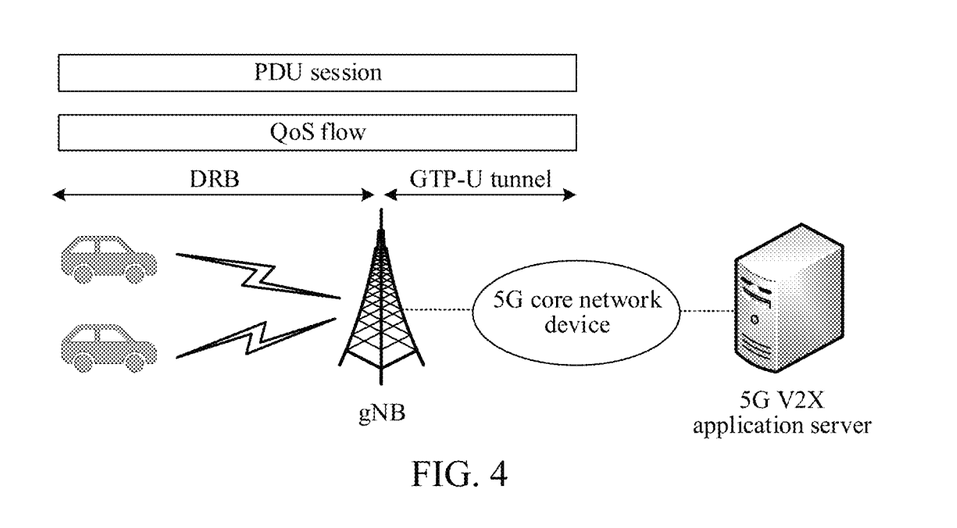
FIG. 4 is a schematic diagram of an application scenario of a vehicle communication method according to an embodiment of this application.

In an embodiment of this application, as shown in FIG. 4, after establishing one PDU session for a plurality of pieces of S-NSSAI, different V2X use cases/network slices may establish different QoS flows. A 5G core network device may isolate different QoS flows from each other through a GTP-U tunnel, a VPN or a bandwidth management mechanism.

In addition, in an embodiment of this application, a wireless side (such as a gNB) may isolate different network slices from each other in a manner of scheduling. Alternatively, the wireless side may configure corresponding shared resource pools for different network slices, to isolate different network slices from each other. Priorities and the resource sizes of the shared resource pools configured by the wireless side may embody priorities of different slices. Furthermore, the wireless side may configure the shared resource pools corresponding to different network slices by using a signaling (such as an RRC signaling or an NAS signaling) or in a manner of pre-configuration, and a correspondence between a network slice and a shared resource pool may be explicitly given in a configuration signaling or may be implicitly given at intervals.

Figure 5:
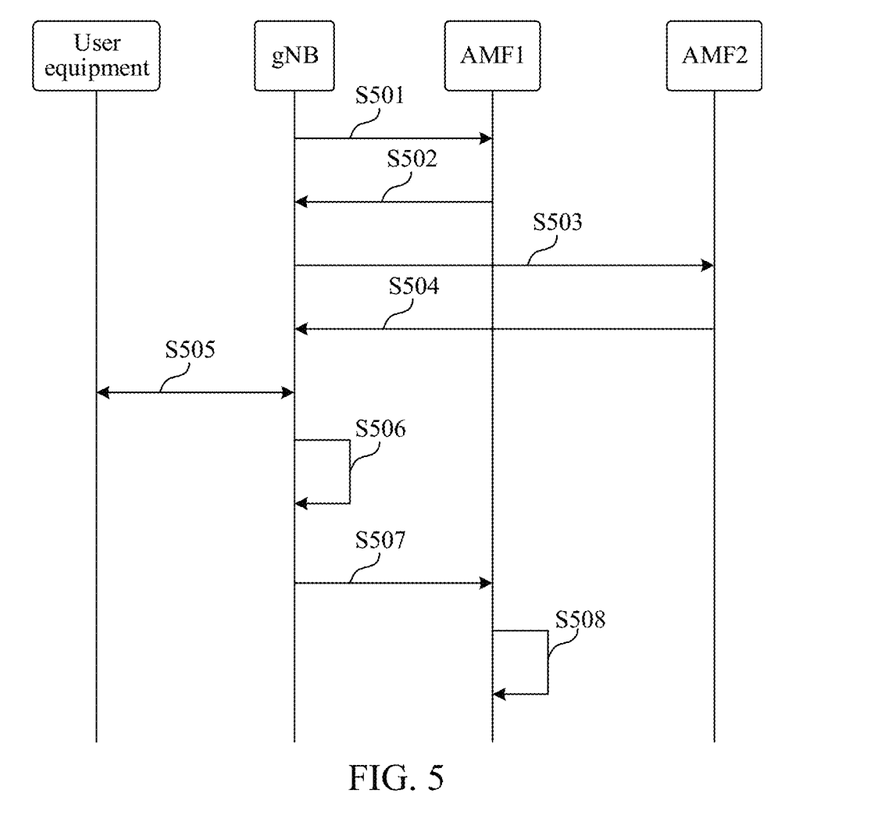
FIG. 5 is a schematic diagram of a partial signaling process of a PDU session established between user equipment and a network side device according to an embodiment of this application.

Based on the technical solution of embodiment 2, in an embodiment of this application, a partial signaling process of establishing a PDU session between a user equipment and a network side device may be shown in FIG. 5. An interaction signaling (such as an RRC message) between the user equipment and a gNB includes information about a network slice, and the process may specifically include the following steps:

S501: The gNB transmits an NG setup request to an AMF1. The NG setup request carries a list of supported S-NSSAI.

S502: The AMF1 returns an NG setup response message to the gNB. The NG setup response message carries the list of supported S-NSSAI.

S503: The gNB transmits an NG setup request to an AMF2. The NG setup request carries a list of supported S-NSSAI.

S504: The AMF2 returns an NG setup response message to the gNB. The NG setup response message carries the list of supported S-NSSAI.

S505: Establish an RRC connection between the gNB and the user equipment.

S506: The gNB identifies a network slicing policy and identifies a core network (CN) node that supports a relevant network slice; or the gNB selects a default CN node. Specifically, the network slicing policy identified by the gNB is to identify whether a plurality of network slices need to be carried by using the same PDU session.

S507: The gNB transmits an initial UE message to the AMF1.

S508: The AMF1 verifies permission of the UE and availability of a network slice.

Embodiment 3: Introduce a Virtual Bundling Network Slice

In an embodiment of this application, network slices of a plurality of V2X use cases correspond to one virtual bundling network slice. A correspondence between the virtual bundling network slice and the network slices of the plurality of V2X use cases may be maintained only on the network side.

In an embodiment of this application, the virtual bundling network slice needs to be identified and distinguished from other network slices (that is, network slices that are not virtually bundled) at a protocol level.

In an embodiment of this application, if the virtual bundling network slice still uses 24-bits S-NSSAI, different ways may be used to distinguish. Optionally, a value interval of the S-NSSAI of the virtual bundling network slice may be separated from that of S-NSSAI of a common network slice; or an indicator bit area may be introduced, such as defining a new SST, to add a corresponding identification bit to the new SST; or a corresponding identification bit may be added to an SD part to distinguish.

In an embodiment of this application, information about the virtual bundling network slice may be maintained only on the network side. This embodiment is the same as the network slices sharing the PDU session (that is, the foregoing embodiment 2) in that, the network slices corresponding to different V2X use cases are still maintained in the core network. However, the UE on the wireless side does not need to maintain the network slices corresponding to all the V2X use cases in allowed NSSAI, but only the virtual bundling network slice may be included in the allowed NSSAI, and then network slices corresponding to a plurality of V2X use cases are bundled into one on the wireless side.

In an embodiment of this application, a connection establishment process of the virtual bundling network slice may be different from that of the common network slice. Specifically, different from a solution provided by the 3GPP Rel-15 that an MSG5 RRC Setup Complete message carries only one piece of S-NSSAI to be selected by an AMF, in the technical solutions of the embodiments of this application, when the UE initials the connection establishment request to the network side device, an MSG5 message carries only one virtual bundling network slice. When the network side device (such as the gNB or the AMF) receives the virtual bundling network slice in the MSG5 message, a new function needs to be introduced to identify the network slices of the plurality of V2X use cases corresponding to the virtual bundling network slice, for example, performing identification according to a correspondence between the virtual bundling network slice and the network slices of the V2X use cases.

In an embodiment of this application, since the network side device (such as the gNB or the AMF) can determine the correspondence between the virtual bundling network slice and the network slices of the plurality of V2X use cases, the isolation between the network slices may still be guaranteed.

Based on the technical solution of embodiment 3, in an embodiment of this application, a partial signaling process of establishing a PDU session between a user equipment and a network side device may also be shown in FIG. 5. In S506, the network slicing policy identified by the gNB is to identify the network slices of the plurality of V2X use cases corresponding to the virtual bundling network slice.

The technical solutions of the foregoing embodiments of this application are applicable to an implementation scenario of a deployment based on a network slice in future 5G Internet of Vehicles and self-driving, and can effectively resolve a limitation problem of network slices provided in the 3GPP Rel-15, thereby improving the number of V2X use cases that can be supported by user equipment, enabling the V2X use cases to use a network slicing mechanism to implement an isolation, and facilitating a promotion and a deployment of an Internet of Vehicles solution.

The following describes apparatus embodiments of this application, and the apparatus embodiments may be used for performing the vehicle communication method in the foregoing embodiment of this application. For details not disclosed in the apparatus embodiments of this application, reference may be made to the foregoing vehicle communication method embodiments of this application.

Figure 6:
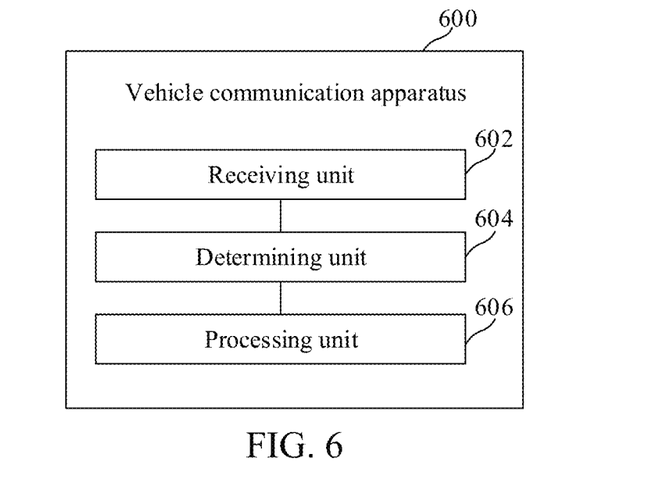
FIG. 6 is a schematic block diagram of a vehicle communication apparatus according to an embodiment of this application.

FIG. 6 is a schematic block diagram of a vehicle communication apparatus according to an embodiment of this application.

Referring to FIG. 6, a vehicle communication apparatus 600 according to an embodiment of this application includes: a receiving unit 602, a determining unit 604, and a processing unit 606.

The receiving unit 602 is configured to receive a connection establishment request transmitted by user equipment, identification information of a plurality of network slices being carried in the connection establishment request. The determining unit 604 is configured to determine whether the plurality of network slices correspond to the same vehicle communication service according to the identification information of the plurality of network slices. The processing unit 606 is configured to establish, in a case that the plurality of network slices are determined to correspond to the same vehicle communication service, a PDU session with the user equipment.

In an embodiment of this application, a value interval of the identification information of the plurality of network slices is in a predetermined interval, to indicate that the plurality of network slices correspond to the same PDU session; or an SST field in the identification information of the plurality of network slices includes an indicator bit, to indicate that the plurality of network slices correspond to the same PDU session; or an SD field in the identification information of the plurality of network slices includes an indicator bit, to indicate that the plurality of network slices correspond to the same PDU session.

In an embodiment of this application, the processing unit 606 is further configured to control, in the PDU session, different network slices or different use cases to correspond to different QoS flows.

In an embodiment of this application, the processing unit 606 is further configured to isolate the different QoS flows by using a GTP-U protocol, a VPN, or a bandwidth management mechanism.

In an embodiment of this application, the vehicle communication apparatus 600 further includes: a scheduling unit, configured to schedule the user equipment to use different wireless transmission resources for different network slices.

In an embodiment of this application, the vehicle communication apparatus 600 further includes: a configuration unit, configured to configure wireless transmission resource pools for different network slices, to make the user equipment use different wireless transmission resources for different network slices. A priority of the wireless transmission resource pool has a positive correlation with a priority of the network slice corresponding to the wireless transmission resource pool, and the resource size of the wireless transmission resource pool has a positive correlation with the priority of the network slice corresponding to the wireless transmission resource pool.

In an embodiment of this application, the configuration unit is configured to transmit a configuration signaling to the user equipment, to configure the wireless transmission resource pools corresponding to the different network slices for the user equipment, or to pre-configure the wireless transmission resource pools corresponding to the different network slices for the user equipment.

In an embodiment of this application, the configuration unit is configured to use the configuration signaling transmitted to the user equipment to indicate the wireless transmission resource pools corresponding to the different network slices in an explicit or implicit manner.

In an embodiment of this application, the vehicle communication apparatus 600 further includes: a transmission unit, configured to transmit available network slice information to the user equipment, the available network slice information including the identification information of the plurality of network slices.

In an embodiment of this application, the plurality of network slices correspond to the same AMF and the same UPF.

In an embodiment of this application, the vehicle communication apparatus 600 further includes: an expansion unit, configured to expand the number of data radio bearers, to expand the number of network slices supported by the user equipment.

Figure 7:
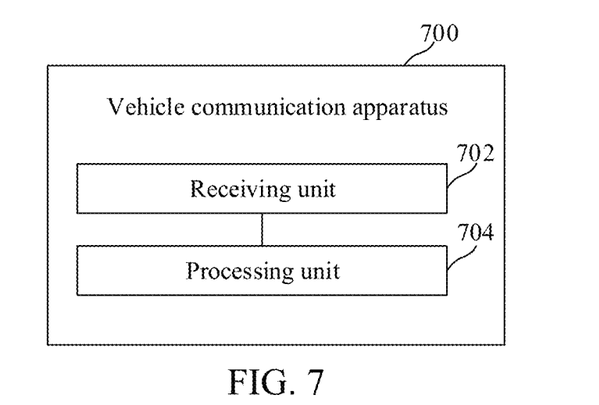
FIG. 7 is a schematic block diagram of a vehicle communication apparatus according to an embodiment of this application.

FIG. 7 is a schematic block diagram of a vehicle communication apparatus according to an embodiment of this application.

Referring to FIG. 7, a vehicle communication apparatus 700 according to an embodiment of this application includes: a receiving unit 702 and a processing unit 704.

The receiving unit 702 is configured to receive a connection establishment request transmitted by user equipment, identification information of a virtual bundling network slice being carried in the connection establishment request. The processing unit 704 is configured to determine identification information of a plurality of network slices corresponding to the virtual bundling network slice according to the identification information of the virtual bundling network slice, to establish a PDU session with the user equipment based on the plurality of network slices.

In an embodiment of this application, the processing unit 704 is configured to determine the identification information of the plurality of network slices corresponding to the virtual bundling network slice according to a pre-configured correspondence.

In an embodiment of this application, the vehicle communication apparatus 700 further includes: a transmission unit, configured to transmit available network slice information to the user equipment, the available network slice information including the identification information of the virtual bundling network slice.

In an embodiment of this application, a value interval of the identification information of the virtual bundling network slice is in a predetermined interval, to indicate that the virtual bundling network slice corresponds to the plurality of network slices; or an SST field in the identification information of the virtual bundling network slice includes an indicator bit, to indicate that the virtual bundling network slice corresponds to the plurality of network slices; or an SD field in the identification information of the virtual bundling network slice includes an indicator bit, to indicate that the virtual bundling network slice corresponds to the plurality of network slices.

Figure 8:
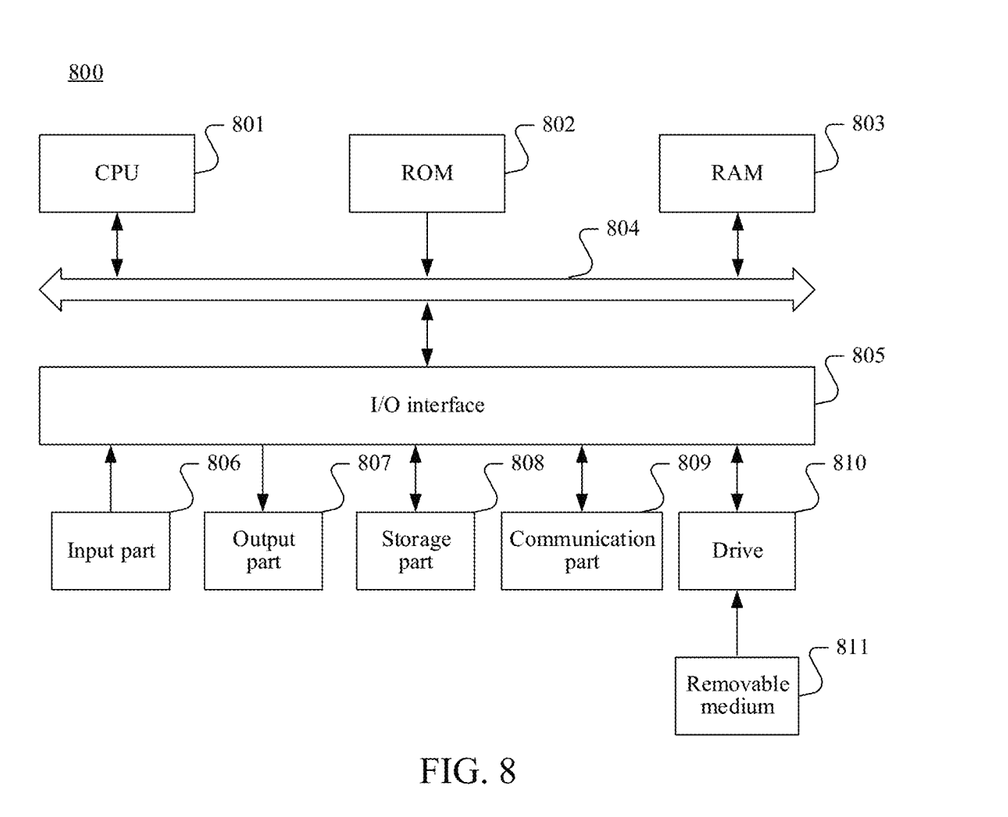
FIG. 8 is a schematic structural diagram of a computer system adapted to implement an electronic device according to an embodiment of this application.

FIG. 8 is a schematic structural diagram of a computer system adapted to implement an electronic device according to an embodiment of this application.

A computer system 800 of the electronic device shown in FIG. 8 is only an example, and is not to impose any restriction on functions and scopes of use of the embodiments of this application.

As shown in FIG. 8, the computer system 800 includes a central processing unit (CPU) 801. The CPU 801 may perform various proper actions and processing according to a program stored in a read-only memory (ROM) 802 or a program loaded from a storage part 808 into a random access memory (RAM) 803. The RAM 803 further stores various programs and data required for system operations. The CPU 801, the ROM 802, and the RAM 803 are connected to each other through a bus 804. An input/output (I/O) interface 805 is also connected to the bus 804.

The following components are connected to the I/O interface 805: an input part 806 including a keyboard, a mouse, or the like, an output part 807 including a cathode ray tube (CRT), a liquid crystal display (LCD), a speaker, or the like, a storage part 808 including a hard disk, or the like, and a communication part 809 including a network interface card such as a local area network (LAN) card or a modem. The communication part 809 performs a communication processing through a network such as the Internet. A drive 810 is also connected to the I/O interface 805 as required. A removable medium 811 such as a magnetic disk, an optical disc, a magneto-optical disk, or a semiconductor memory is installed on the drive 810 as required, so that a computer program read from the removable medium 811 is installed into the storage part 808 as required.

Particularly, according to the embodiments of this application, the processes described below by referring to the flowcharts may be implemented as computer software programs. For example, this embodiment of this application includes a computer program product, and the computer program product includes a computer program carried on a computer-readable medium, and the computer program includes program code used for performing the methods shown in the flowcharts. In such an embodiment, the computer program may be downloaded and installed through the communication part 809 from a network, and/or installed from the removable medium 811. When the computer program is executed by the CPU 801, various functions defined in the system of this application are executed.

The computer-readable medium shown in the embodiments of this application may be a computer-readable signal medium or a computer-readable storage medium or any combination of the two. The computer-readable storage medium may be, for example, but is not limited to, an electric, a magnetic, an optical, an electromagnetic, an infrared, or a semi-conductive system, apparatus, or device, or any combination of the above. A more specific example of the computer-readable storage medium may include but is not limited to: an electrical connection including one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination of the above. In this application, the computer-readable storage medium may be any tangible medium including or storing a program, and the program may be used by or used in combination with an instruction execution system, an apparatus, or a device. In this application, a computer-readable signal medium may include a data signal propagated in a baseband or as part of a carrier, and stores computer-readable program code. Such a propagated data signal may be in a plurality of forms, including but not limited to an electromagnetic signal, an optical signal, or any suitable combination of the above. The computer-readable signal medium may be further any computer-readable medium in addition to the computer-readable storage medium. The computer-readable medium may send, propagate, or transmit a program configured to be used by or in combination with an instruction execution system, an apparatus, or a device. The program code included in the computer-readable medium may be transmitted by using any suitable medium, including but not limited to: a wireless medium, a wired medium, or the like, or any suitable combination of the above.

The flowcharts and block diagrams in the accompanying drawings illustrate possible system architectures, functions and operations that may be implemented by the system, the method, and the computer program product according to various embodiments of this application. In this aspect, each box in a flowchart or a block diagram may represent a module, a program segment, or a part of code. The module, the program segment, or the part of code includes one or more executable instructions used for implementing specified logic functions. In some implementations used as substitutes, functions annotated in the boxes may alternatively be occur in a sequence different from that annotated in the accompanying drawings. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a specified function or an operation, or may be implemented by using a combination of dedicated hardware and a computer instruction.

A related unit described in the embodiments of this application may be implemented in a software manner, or may be implemented in a hardware manner, and the unit described may also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are mentioned in the foregoing detailed description, such division is not mandatory. Actually, according to the implementations of this application, the features and functions of two or more modules or units described above may be specified in one module or unit. Conversely, features and functions of one module or unit described above may be further divided into a plurality of modules or units to be specified. In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

Through the descriptions of the foregoing implementations, a person skilled in the art easily understands that the exemplary implementations described herein may be implemented by using software, or may be implemented by using software in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network. The network includes several instructions for instructing a computing device (which may be a personal computer, a server, a touch terminal, a network device, or the like) to perform the methods according to the embodiments of this application.

After considering the specification and practicing the present disclosure, a person skilled in the art can readily think of other implementations of this application. This application is intended to cover any variations, uses or adaptation of this application following the general principles of this application, and includes the well-known knowledge and conventional technical means in the art and undisclosed in this application.

It is to be understood that this application is not limited to the accurate structures that are described above and that are shown in the accompanying drawings, and modifications and changes may be made without departing from the scope of this application. The scope of this application is limited by the appended claims only.

What is claimed is:

1. A vehicle communication method, comprising:
   receiving, by a network side device, a connection establishment request transmitted by user equipment, wherein identification information of a plurality of network slices is carried in the connection establishment request;
   determining, by the network side device, whether the plurality of network slices correspond to a same vehicle communication service according to the identification information of the plurality of network slices;
   establishing, by the network side device in a case that the plurality of network slices are determined to correspond to the same vehicle communication service, a protocol data unit (PDU) session with the user equipment; and
   configuring, by the network side device, wireless transmission resource pools for different network slices, to enable the user equipment to use different wireless transmission resources for different network slices, wherein a wireless transmission resource pool of a high priority is configured to be associated with a network slice of a high priority and a wireless transmission resource pool of a low priority is configured to be associated with a network slice of a low priority.

2. The vehicle communication method according to claim 1, wherein values of the identification information of the plurality of network slices are chosen within a predetermined value interval, to indicate that the plurality of network slices correspond to the same PDU session;
   a slice/service type (SST) field in each of the values of the identification information of the plurality of network slices comprises an indicator bit, to indicate that the plurality of network slices correspond to the same PDU session; or
   a slice differentiator (SD) field in each of the values of the identification information of the plurality of network slices comprises an indicator bit, to indicate that the plurality of network slices correspond to the same PDU session.

3. The vehicle communication method according to claim 1, wherein in the PDU session, different network slices or different vehicle communication use cases correspond to different quality of service flows (QoS flow).

4. The vehicle communication method according to claim 3, further comprising:
   isolating, by the network side device, the different QoS flows by using a GPRS tunneling protocol user plane (GTP-U), a virtual private network (VPN) or a bandwidth management mechanism.

5. The vehicle communication method according to claim 1, further comprising:
   scheduling, by the network side device, the user equipment to use different wireless transmission resources for different network slices.

6. The vehicle communication method according to claim 1, wherein the configuring, by the network side device, wireless transmission resource pools for different network slices comprises:
   transmitting, by the network side device, a configuration signaling to the user equipment, to configure the wireless transmission resource pools corresponding to the different network slices for the user equipment; or
   pre-configuring, by the network side device, the wireless transmission resource pools corresponding to the different network slices for the user equipment.

7. An electronic device, comprising:
   one or more processors; and
   a storage apparatus, configured to store one or more programs, the one or more programs, when executed by the one or more processors, causing the electronic device to:
   receive a connection establishment request transmitted by user equipment, wherein identification information of a plurality of network slices is carried in the connection establishment request;
   determine whether the plurality of network slices correspond to a same vehicle communication service according to the identification information of the plurality of network slices;
   establish, in a case that the plurality of network slices are determined to correspond to the same vehicle communication service, a protocol data unit (PDU) session with the user equipment; and configure wireless transmission resource pools for different network slices, to enable the user equipment to use different wireless transmission resources for different network slices, wherein a wireless transmission resource pool of a high priority is configured to be associated with a network slice of a high priority and a wireless transmission resource pool of a low priority is configured to be associated with a network slice of a low priority.

8. The electronic device according to claim 7, wherein values of the identification information of the plurality of network slices are chosen within a predetermined value interval, to indicate that the plurality of network slices correspond to the same PDU session;

a slice/service type (SST) field in each of the values of the identification information of the plurality of network slices comprises an indicator bit, to indicate that the plurality of network slices correspond to the same PDU session; or a slice differentiator (SD) field in each of the values of the identification information of the plurality of network slices comprises an indicator bit, to indicate that the plurality of network slices correspond to the same PDU session.

9. The electronic device according to claim 7, wherein in the PDU session, different network slices or different vehicle communication use cases correspond to different quality of service flows (QoS flow).

10. The electronic device according to claim 9, wherein the electronic device is further configured to:

isolate the different QoS flows by using a GPRS tunneling protocol user plane (GTP-U), a virtual private network (VPN) or a bandwidth management mechanism.

11. The electronic device according to claim 7, wherein the electronic device is further configured to:

schedule the user equipment to use different wireless transmission resources for different network slices.

12. The electronic device according to claim 7, wherein the electronic device is further configured to:

transmit a configuration signaling to the user equipment, to configure the wireless transmission resource pools corresponding to the different network slices for the user equipment; or pre-configure the wireless transmission resource pools corresponding to the different network slices for the user equipment.

13. A non-transitory computer-readable storage medium, storing a plurality of computer programs, the computer programs, when executed by one or more processors of an electronic device, causing the electronic device to:

receive a connection establishment request transmitted by user equipment, wherein identification information of a plurality of network slices is carried in the connection establishment request;

determine whether the plurality of network slices correspond to a same vehicle communication service according to the identification information of the plurality of network slices;

establish, in a case that the plurality of network slices are determined to correspond to the same vehicle communication service, a protocol data unit (PDU) session with the user equipment; and configure wireless transmission resource pools for different network slices, to enable the user equipment to use different wireless transmission resources for different network slices, wherein a wireless transmission resource pool of a high priority is configured to be associated with a network slice of a high priority and a wireless transmission resource pool of a low priority is configured to be associated with a network slice of a low priority.

14. The non-transitory computer-readable storage medium according to claim 13, wherein values of the identification information of the plurality of network slices are chosen within a predetermined value interval, to indicate that the plurality of network slices correspond to the same PDU session;

a slice/service type (SST) field in each of the values of the identification information of the plurality of network slices comprises an indicator bit, to indicate that the plurality of network slices correspond to the same PDU session; or a slice differentiator (SD) field in each of the values of the identification information of the plurality of network slices comprises an indicator bit, to indicate that the plurality of network slices correspond to the same PDU session.

15. The non-transitory computer-readable storage medium according to claim 13, wherein in the PDU session, different network slices or different vehicle communication use cases correspond to different quality of service flows (QoS flow).

16. The non-transitory computer-readable storage medium according to claim 15, wherein the electronic device is further configured to:

isolate the different QoS flows by using a GPRS tunneling protocol user plane (GTP-U), a virtual private network (VPN) or a bandwidth management mechanism.

17. The non-transitory computer-readable storage medium according to claim 13, wherein the electronic device is further configured to:

schedule the user equipment to use different wireless transmission resources for different network slices.

18. The non-transitory computer-readable storage medium according to claim 13, wherein the electronic device is further configured to:

transmit a configuration signaling to the user equipment, to configure the wireless transmission resource pools corresponding to the different network slices for the user equipment; or pre-configure the wireless transmission resource pools corresponding to the different network slices for the user equipment.

* * * * *